(12) United States Patent
Whiter

(10) Patent No.: US 12,240,954 B2
(45) Date of Patent: Mar. 4, 2025

(54) SURFACE FINISHING MOULDING MATERIAL COMPRISING A RHEOLOGY-MODIFIED EPOXY LAYER

(71) Applicant: HEXCEL COMPOSITES LIMITED, Duxford (GB)

(72) Inventor: Mark Whiter, Saffron Walden (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 367 days.

(21) Appl. No.: 17/770,567

(22) PCT Filed: Sep. 23, 2020

(86) PCT No.: PCT/EP2020/076506
§ 371 (c)(1),
(2) Date: Apr. 20, 2022

(87) PCT Pub. No.: WO2021/099009
PCT Pub. Date: May 27, 2021

(65) Prior Publication Data
US 2022/0289924 A1  Sep. 15, 2022

(30) Foreign Application Priority Data

Nov. 20, 2019 (GB) .................................. 1916900

(51) Int. Cl.
| C08J 5/24 | (2006.01) |
| B29C 70/18 | (2006.01) |
| B32B 5/02 | (2006.01) |
| B32B 27/20 | (2006.01) |
| B32B 27/38 | (2006.01) |

(Continued)

(52) U.S. Cl.
CPC .............. C08J 5/247 (2021.05); B29C 70/18 (2013.01); B32B 5/022 (2013.01); B32B 27/20 (2013.01);

(Continued)

(58) Field of Classification Search
CPC ......... B32B 5/022; B32B 5/024; B32B 5/263; B32B 5/265; B32B 7/02; B32B 7/022;

(Continued)

(56) References Cited

U.S. PATENT DOCUMENTS 11,565,825 B2 * 1/2023 Sang ...................... B32B 27/10
2004/0192137 A1 9/2004 Starkey et al.

(Continued)

FOREIGN PATENT DOCUMENTS

| EP | 2346679 A1 | 7/2011 |
| EP | 3330081 A1 | 6/2018 |

(Continued)

OTHER PUBLICATIONS

Dow Chemical, Product Information of DER-331, Liquid Epoxy Resin. (Year: 1999).*

(Continued)

Primary Examiner — Hoa (Holly) Le
(74) Attorney, Agent, or Firm — W. Mark Bielawski

(57) ABSTRACT

A moulding material which comprises: (a) a structural reinforcement layer comprising a fibrous reinforcement material optionally in combination with a second resin composition; and (b) a surface enhancing layer, for contacting a surface of a mould or tool, comprising a first nonwoven fibre carrier in combination with a first resin composition containing a rheology modifier and a curing agent, wherein the first resin composition provides an external mould or tool-contacting surface of the moulding material. The moulding material can be cured to form a moulded article having a high quality surface finish that requires minimal preparation before painting and/or application in its intended use. The moulded article may be provided with sacrificial discontinuous indicator means to assist in uniform (Continued)

removal of a part of the surface enhancing layer of the moulded article for specific applications.

7 Claims, 1 Drawing Sheet

(51) Int. Cl.
 *B29K 63/00* (2006.01)
 *B29K 309/08* (2006.01)
(52) U.S. Cl.
 CPC .............. *B32B 27/38* (2013.01); *C08J 5/249* (2021.05); *B29K 2063/00* (2013.01); *B29K 2309/08* (2013.01); *B32B 2260/021* (2013.01); *B32B 2260/046* (2013.01); *B32B 2262/101* (2013.01); *B32B 2307/718* (2013.01); *C08J 2363/02* (2013.01)
(58) Field of Classification Search
 CPC ......... B32B 27/18; B32B 27/26; B32B 27/38; B32B 37/144; B32B 2038/0016; B32B 2038/0076; B32B 2038/08; B32B 2038/10; B32B 2250/04; B32B 2307/50; B32B 2307/718; C08J 5/24–249
 See application file for complete search history.

(56) References Cited

U.S. PATENT DOCUMENTS

| | | | |
|---|---|---|---|
| 2018/0346146 A1* | 12/2018 | Sang | ..................... B32B 9/047 |
| 2019/0061290 A1 | 2/2019 | Whiter et al. | |
| 2021/0253270 A1* | 8/2021 | Sang | ..................... B32B 3/12 |

FOREIGN PATENT DOCUMENTS

| | | |
|---|---|---|
| EP | 3533575 A1 | 9/2019 |
| GB | 2464539 B | 1/2014 |
| GB | 2533629 A | 6/2016 |
| WO | 2008/007094 A2 | 1/2008 |
| WO | 2010/046682 A2 | 4/2010 |
| WO | 2017/021147 A1 | 2/2017 |

OTHER PUBLICATIONS

GB Search Report, issued in the priority GB Patent Application No. GB1916900.2, mailed on May 19, 2020.
International Search Report (ISR) and Written Opinion (WO), issued in the parent Patent Cooperation Treaty (PCT), Application No. PCT/EP2020/076506, mailed on Nov. 11, 2020.

* cited by examiner

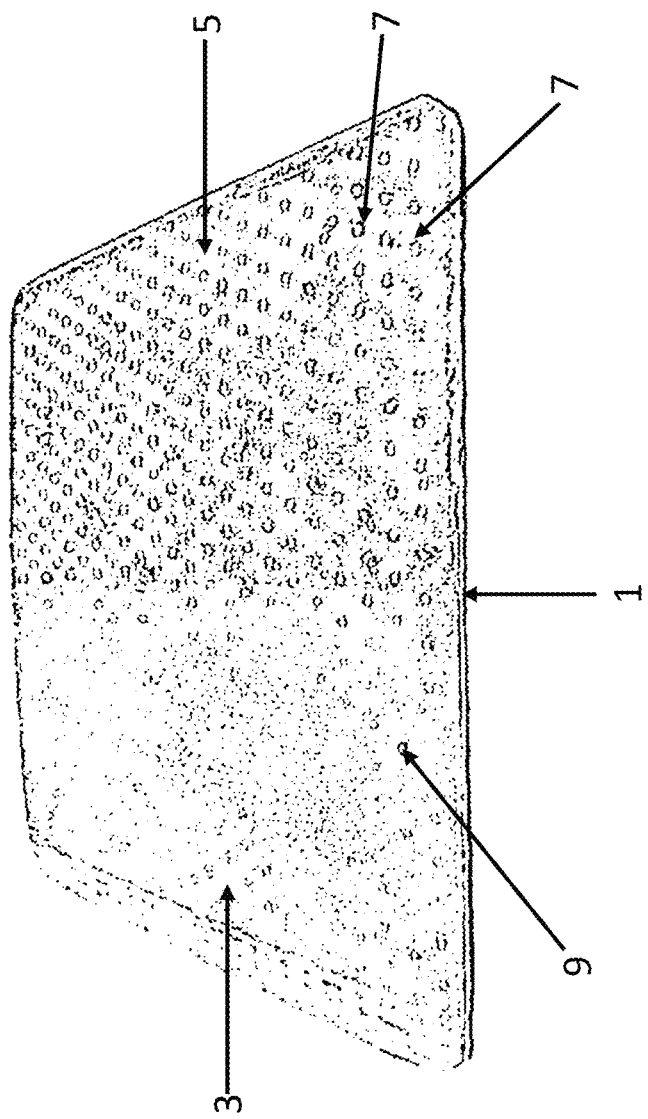

SURFACE FINISHING MOULDING MATERIAL COMPRISING A RHEOLOGY-MODIFIED EPOXY LAYER

The present invention relates to moulding materials that provide enhanced surface finish, as well as a process of preparing the same, a process of preparing moulded articles by curing such moulding materials, and moulded articles obtainable by such a process. The present invention is particularly concerned with fibre-reinforced composite moulding materials that can be cured at low temperatures and include a surface finishing layer to provide a moulded article having a high quality surface finish that requires minimal preparation after curing, especially but not exclusively for use in the wind turbine and automotive industries.

Composite materials have well-documented advantages over traditional construction materials, particularly in providing excellent mechanical properties at very low material densities. As a result, the use of such composite materials has become widespread in many industries, including the aerospace, automotive, marine and wind turbine industries.

Prepregs, comprising a fibre arrangement impregnated with a thermosetting resin, such as epoxy resin, are widely used in the generation of such composite materials. Typically, a number of plies of such prepregs are "laid-up" as desired and the resulting assembly, or laminate, is placed in a mould and cured, usually by exposure to elevated temperatures, optionally under pressure, to produce a cured composite laminate. However, without any surface treatment, such composite materials often cure to give a poor surface finish, which may manifest itself as a rough, wavy or pin-holed surface, or as narrow grooves in the surface of a moulded structure where adjacent plies of prepregs have been overlapped to ensure a continuous layer. This tendency to form an uneven surface appears to be closely linked to the coarseness of the underlying reinforcement, the problem being more pronounced the coarser the reinforcement. This can be a particular problem when coarse reinforcement is used for structural rigidity and yet a smooth surface finish is desirable, such as, for example, in the production of body panels for automobiles, where a Class A finish is required, or in the production of blades for wind turbines.

There have been a number of different approaches to improving the surface finish of fibre-reinforced composite moulding materials and moulded articles produced from such materials. Manufacturers of large composite structures, such as blades for wind turbines, for example, typically use an in-mould gel coat or process coat which acts as a surface finishing layer that can be finished after demoulding by filling in defects and sanding to remove mould release agents and minor imperfections and to "key-in" the surface, prior to application of a top coat layer of paint to protect the structure from environmental conditions. Essentially, such a gel coat process involves pasting a flowable composition on the internal surface of the mould which is then partially cured to form a gel layer, the prepreg assembly being placed onto the gel layer prior to curing. During cure, the prepreg and gel coat fuse together, this generally resulting in a smooth surface to the formed composite. However, the process is very labour intensive in requiring an initial curing step and tends to produce a gel layer of uneven thickness. Furthermore, the layer needs to be relatively thick (e.g., on average 0.3 mm) to cover up the defects, which can lead to an undesirable increase in weight.

Other approaches have used surface finishing films incorporated into a mould engaging surface of the composite moulding material that typically comprise a thermosetting resin supported on a non-woven mat carrier. WO2008/007094 A2, for example, discloses a composite material assembly which comprises; a) a surface enhancing layer comprising at least one layer of fibres, having a length to width aspect ratio of more than 5:1 and b) a structural layer comprising at least one reinforcing fibre and at least one polymeric matrix. This document discloses that the fibres used in the surface enhancing layer may be prepared by segmenting fibres longitudinally and then forming a film or veil from the segmented fibres, such that the resultant veil structure is much denser, having an increased fibre density for the same weight. This document discloses that the denser veil structure provides an improved surface finish both in terms of appearance and smoothness.

Manufacturers of large composite parts, such as blades for wind turbines, are also keen to ensure that any traces of mould release agent, which is used to coat the mould to facilitate release of the composite part after cure, and which subsequently gets transferred onto the surface of the cured part, is removed in order to ensure good adhesion of the final top coat layer of paint to the composite surface. Such traces of mould release agent are typically removed using a sanding process. However, one problem that has been found when surface finishing films are incorporated into a mould engaging surface of a composite moulding material is that end users sand laminates comprising the surface finishing film to such an extent that they damage its structure and produce the very same pinholes in the surface the finishing film was intended to prevent. When sanding, end users typically look for a change in the level of surface gloss as an indication of sufficient sanding. It appears that the surfaces produced by use of a finishing film as described above are more resistant to sanding than they are used to and as a result they tend to use a more aggressive sanding regime, resulting in damage occurring.

One approach to overcome this problem has been to improve the ease of sanding of the surface enhancing layer in order to ensure that any traces of mould release agent can be easily removed under typical sanding conditions. WO2010/046682A1, for example, discloses a prepreg assembly comprising resin and fibres and comprising an uppermost curable resin surface layer, such that when the assembly is cured, the uppermost surface layer has a sandability of at least 0.30 mg/cycle over 200 cycles, as measured according to ASTM D4060 using a Taber 5151 Abrasion Tester fitted with H18 wheels and a 1.0 kg weight. In a preferred embodiment, the uppermost curable resin surface layer comprises at least 10.0% by weight of a particulate granular material in the form of glass spheres having a particle size of from 5 to 50 μm, to provide the necessary sanding properties.

Other approaches have addressed the issue of slippage of fibre-reinforced composite moulding materials when laid-up in a mould, which can lead to irregularities in the surface of the moulded article after cure. This problem may be particularly relevant where adjacent layers of reinforcement or prepreg are overlapped in a mould, which can lead to resin starvation at the area of overlap and cause the formation of a narrow indent along the seam of the overlap upon curing. WO2017/021147A1, for example, discloses a moulding material comprising a layer of a fibrous material in a curable resin matrix provided on at least one surface with a surface finishing film comprising tacky resin wherein a veil is provided on the surface of the finishing film remote from the moulding material and perforations are formed in the veil to allow passage of the tacky resin of the surface finishing film through the veil during a moulding operation. This document discloses that the presence of such perforations in the veil allows small amounts of the tacky resin to provide a light tack between the moulding material and a mould surface, thereby holding the moulding material in place.

The various approaches to improving surface finish of fibre-reinforced composite moulding materials and moulded articles produced from such materials described above all suffer from certain disadvantages, such as the need to cure additional gel coat layers in moulds, or to use surface finishing layers containing longitudinally sectioned fibres, or to include additional glass spheres to improve ease of sanding of the surface finishing layer, or to perforate any fibre veil in the surface finishing layer, which may in turn have an effect upon resin flow and surface finish.

The present invention aims to overcome at least some of the aforesaid problems and/or to provide improvements generally.

According to the present invention, there is provided a moulding material, a process of preparing the same, a process of preparing moulded articles by curing such moulding materials, and moulded articles obtainable by such a process as described hereinafter or as defined in any one of the accompanying claims.

Accordingly, in a first aspect of the invention, there is provided a moulding material which comprises: (a) a structural reinforcement layer comprising a fibrous reinforcement material; and (b) a surface enhancing layer, for contacting a surface of a mould or tool, comprising a first non-woven fibre carrier in combination with a first resin composition containing a rheology modifier and a curing agent, wherein the first resin composition provides an external mould or tool-contacting surface of the moulding material.

The first resin composition at least partially impregnates the first non-woven layer, and in preferred embodiments it fully impregnates the first non-woven layer. However, it is an essential feature of the invention that a sufficient amount of the first resin composition is present on the surface of the first non-woven layer remote from the structural reinforcement layer to form a continuous layer on the external mould or tool-contacting surface of the moulding material.

In the context of the present invention, the term "moulding material" refers to a fibre-reinforced composite material that can be laid-up with other such materials in a mould or tool and cured to form a composite part that takes the shape of the mould or tool. Such moulding materials can be used to prepare many different component parts, including but not limited to components of wind turbines, including nacelles, propellers and rotor blades.

The structural reinforcement layer can be in many forms. Normally the moulding material according to the present invention will contain several structural reinforcement layers, although for some applications a single layer may suffice.

The fibrous reinforcement material may be in the form of a sheet or continuous mat or continuous filaments. In other embodiments, the fibrous reinforcement material comprises fibres of short length, for example a chopped strand mat. The fibrous reinforcement material may be in the form of multiple fibre tows each containing multiple fibre filaments to form each tow. The tows may be stitched or woven to form a fabric. The fibres may consist of natural materials, such as cotton, flax, hemp, wool or silk; or semi-synthetic materials, such as rayon, viscose, modal, etc.; or synthetic materials, such as carbon, polyester, mineral, nylon, acrylic, glass, aramid (aromatic polyamide), etc. In preferred embodiments, the fibre reinforcement comprises carbon fibres or glass fibres.

In some embodiments, the fibrous reinforcement material is in the form of a woven fabric. In other embodiments, the fibrous reinforcement material comprises a unidirectional (UD) fabric in which the majority of fibres, rovings or tows present in the fabric run in one direction only, although a small number of fibres, rovings or tows may run in a different direction to the majority, for example as cross-stitching in order to maintain the unidirectional alignment of the latter. The fibres, rovings or tows in a unidirectional fabric may be held in alignment by a number of different methods, including weaving, stitching and bonding. Consequently, such unidirectional fabrics may be woven or non-woven. In further embodiments, the fibrous reinforcement material comprises a unidirectional fabric in combination with a biaxial or multiaxial fabric or mat in which either component may be woven or non-woven.

Suitable woven and non-woven fabrics for use in composites are commercially available from specialist manufacturers including but not limited to Chomarat Textiles Industries, Esher, Surrey, United Kingdom, Hexcel Reinforcements UK Limited, Narborough, Leicestershire, United Kingdom, and Zhenshi Group Hengshi Fibreglass Fabrics Co., Ltd., Tongxiang Economic Development Zone, Jiaxing Zhejiang, 314500 China. In an embodiment, the woven or non-woven fabric is a carbon fibre or glass fibre fabric, such as BB200, BB600 or BB1200, where the designation BB1200, for example, refers to a biaxial glass fabric having an areal weight of 1200 $g/m^2$.

Hybrid or mixed fibre systems may also be envisaged. The use of cracked (i.e. stretch-broken) or selectively discontinuous fibres may be advantageous to facilitate lay-up of the moulding material according to the present invention and improve its capability of being shaped.

The areal weight of the fibrous reinforcement material is generally from 40 to 4,000 $g/m^2$. In preferred embodiments, the areal weight of fibres is preferably in the range of 100 to 2,500 $g/m^2$, more preferably 150 to 2,000 $g/m^2$.

The fibrous reinforcement material in the structural reinforcement layer, or structural reinforcement layers where more than one layer is present, will typically be a heavy-weight, non-crimp fabric, such as a glass fabric. For glass reinforcements, fibres of 68 to 2400 tex (grams per kilometre of yarn) are particularly adapted.

The surface enhancing layer of the moulding material according to the present invention comprises a first non-woven fibre carrier. In the context of the present invention, a non-woven fibre carrier means any non-woven material that is both air and resin permeable. Suitable non-woven fibre carriers are lightweight, preferably less than 100 $g/m^2$, but are preferably robust enough to carry a layer of resin and to withstand processing in the processes of the invention. Non-woven fibre carriers may comprise continuous fibres or discontinuous fibres. In an embodiment, the first non-woven fibre carrier comprises a veil (sometimes known as a fleece). In the context of the present invention, the term "veil" refers to a thin, lightweight (i.e. an areal weight of no more than 100 $g/m^2$), porous, non-woven, fibrous reinforcement. In a preferred embodiment, the first non-woven fibre carrier consists of fibres of a thermoplastic material, preferably wherein the fibres are bound together using an organic binder to impart structural integrity to the material. In a particular embodiment, the thermoplastic material comprises a polyester, or an aliphatic or semi-aromatic polyamide, such as nylon or polyester fibres. In another embodiment, the non-woven fibre carrier comprises a veil formed of a blend of thermoplastic fibres, such as a blend of polyester and nylon fibres. The organic binder is typically present in an amount of 1 to 10% by weight based on the total weight of the first non-woven fibre carrier. The purpose of the first non-woven fibre carrier is to act as a support or carrier for the first resin composition and to control the manner in which the first resin composition interacts with the surface of a mould or tool in order to provide a good surface finish. In an embodiment, the first non-woven fibre carrier has an openness of between 1 to 10%, preferably 2 to 9%, and/or a mean open area of between 75 to 350 μm². In preferred embodiments, the first non-woven fibre carrier has an areal weight in the range of 1 to 80 g/m², preferably from 5 to 50 g/m², more preferably from 10 to 40 g/m². In an embodiment, the first non-woven fibre carrier has an air permeability of approximately 2,300 L/m²/s at an applied pressure of 200 Pa. The air permeability of the non-woven fibre carrier may be measured by ASTM D737-18—Standard Test Method for Air Permeability of Textile Fabrics. Suitable thermoplastic fibre veils include those commercially available under the trade name Optiveil® T2761-00 from Technical Fibre Products Limited, Burnside Mills, Kendal, Cumbria, United Kingdom.

The surface enhancing layer includes a first resin composition in addition to the first non-woven fibre carrier. The first resin composition generally comprises a thermosetting resin, such as a polyester resin, a polyurethane resin, a polyurethane/polyurea resin, a phenol-formaldehyde resin, a urea-formaldehyde resin, a vinyl ester resin, a cyanate ester resin, a polyimide resin or an epoxy resin. In an embodiment, the first resin composition is a thermosetting resin composition, preferably an epoxy resin composition, i.e. comprising an epoxy resin or a blend of epoxy resins. Suitable epoxy resins include the M9 and M79 range of epoxy resins available from Hexcel Composites Limited, Duxford, Cambridgeshire, United Kingdom.

In an embodiment, the first resin composition comprises an epoxy resin having an Epoxy Equivalent Weight (EEW) in the range of 150 to 1,500, preferably in the range of 150 to 1,250, preferably in the range of 150 to 1,000, preferably in the range of 150 to 750, preferably in the range of 150 to 500, preferably in the range of 200 to 500, preferably in the range of 200 to 450, preferably in the range of 250 to 350, or any combination thereof.

The first resin composition includes at least one curing agent to facilitate cross-linking of the resin and curing of the moulding material, especially at temperatures of 100° C. or less. In the context of the present invention, the term "curing agent" is understood to include any curing agents and/or accelerators capable of effecting or increasing the rate of cross-linking of the first resin composition. Such curing agents and/or accelerators for use in the invention are well-known in the art. In an embodiment, the first resin composition comprises a latent curing agent that is a substituted urea. Suitable substituted urea curing agents include the range of materials available under the trade name Dyhard® from AlzChem Group AG, Trostberg, Germany, including UR200, UR300, UR400, UR500, UR600 and UR700, and the range of materials available under the trade name Omicure® from Emerald Performance Materials, Moorefield, New Jersey, USA, including U-24M, U-35M, U-52, U-52M, U-210, U-210M, U-405, U-405M, U-410M and U-415M. In further embodiments the curing agent may comprise a dicyandiamide curative in combination with the substituted urea. The curing agent may be present in any amount suitable to cause the resin to cure under selected conditions. In embodiments, the curing agent is present in an amount of 1 to 25 wt %, 1 to 20 wt %, 1 to 15 wt %, 1 to 10 wt %, or 2 to 8 wt % based on the total weight of resin composition, or any combination thereof.

It is important that the first resin composition contains a rheology modifier. In the context of the present invention, the term "rheology modifier" is used to refer to a compound or substance that is capable of imparting non-Newtonian rheological properties in materials such as the first resin composition. In the present invention, the rheology modifier should cause the minimum viscosity of the resin under shear to be increased compared to the non-viscosity modified resin, and should also cause the viscosity of the resin when not under shear to be increased by a greater amount compared to the non-rheology modified resin. This can be measured using a shear sweep viscosity method. Suitable conditions for a shear sweep viscosity method are 25 mm parallel plates with a gap of 1 mm set to provide a shear rate from 0.1 to $100^{-s}$, and a temperature of 60° C. In the present invention, the rheology modifier is preferably selected such that when measured as set out above, the first resin composition has a viscosity at 60° and at $0.1\ s^{-1}$ of from 200 to 1000 Pa·s; and a viscosity at 60° C. and at $100\ s^{-1}$ of 25% or less of the viscosity at $0.1\ s^{-1}$, with the proviso that the viscosity at 60° C. and at $100\ s^{-1}$ is not less than 25 Pa·s.

A shear sweep viscosity method may be carried out using any viscometer adapted to provide the above conditions, for example using a TA HR-2 Discovery Hybrid Rheometer manufactured by TA Instruments, New Castle, Delaware, USA.

Suitable rheology modifiers include treated and untreated grades of fumed silica, such as hydrophobic silica. Hydrophilic silica may also be used, but preferably in combination with a thixotrophy booster. Organophilic phyllosilicates may also be used. Suitable silicas include Aerosil® R 202, available from Evonik Resource Efficiency GmbH, Germany, and Cab-O-Sil® TS720, available from Cabot Corporation, Alpharetta, Georgia, USA. Suitable organophilic phyllosilicates include Garamite-7305, available from BYK (Altana Group). Suitable thixotropy boosters include those available under the trade name Rheobyk® from BYK-Chemie GmbH, Wesel, Germany. In an embodiment, the rheology modifier is a hydrophobic fumed silica, such as Aerosil® R202.

The rheology modifier, optionally in combination with a thixotropy booster, may be present in an amount 1 to 20% by weight based on the total weight of the first resin composition. In preferred embodiments, the rheology modifier is present in an amount of 1 to 15% by weight, 1 to 12% by weight, 1 to 10% by weight, 2 to 10% by weight, 3 to 9% by weight, 4 to 8% by weight, or any combination thereof, based on the total weight of the first resin composition.

We have found that the use of a lightweight, highly-closed microfiber veil in combination with a rheology modified epoxy resin composition having the viscosity characteristics described above provides a surface enhancing layer having good gap filling properties, resulting in greatly reduced formation of pin-holes, and also reduces or completely eliminates the narrow groves caused when plies of moulding material are overlapped during laying up.

The first resin composition may also include other components, such as toughening agents, particulate fillers (such as microballoons, glass spheres, talc, etc.), dyes, air release agents or pigments, etc.

The first resin composition is provided on an external mould or tool-contacting surface of the moulding material, i.e., a surface of the moulding material that makes contact with the surface of a mould or tool when the moulding material is laid-up ready for curing. In its simplest form, for example, the moulding material comprises a layer of the first resin composition on top of which is a non-woven fibre carrier such as a lightweight surface veil, which together form the surface enhancing layer, on top of which is a layer of fibrous reinforcement material such as a heavyweight glass fabric mat, which forms the structural reinforcement layer. In this case, the layer of the first resin composition will generally be a thick layer having a high areal weight because the amount of the first resin composition must be sufficient to impregnate not only the surface veil but also the fibrous reinforcement layer once the layers are consolidated.

In another embodiment, the structural reinforcement layer is present in combination with a second resin composition. In this case, the moulding material may comprise a layer of the first resin composition on top of which is a lightweight surface veil, which together form the surface enhancing layer, on top of which is a layer of heavyweight fibrous reinforcement material and, lastly, a layer of a second resin composition, which last two layers form the structural reinforcement layer. In a further embodiment, the layer of the second resin composition may be between the fibrous reinforcement material and the non-woven fibre carrier layers. In either case, the second resin composition may partially or fully impregnate the structural reinforcement layer following consolidation of the layers, for example to form a semipreg or prepreg structure.

Any of the resin composition discussed with respect to the first resin composition are suitable for use as the second resin composition. However, since the purpose of the second resin composition is chiefly structural, rather than to provide gap-filling properties, it is not essential for the second resin composition to comprise a rheology modifier; however the second resin composition may include a rheology modifier if desired. In certain preferred embodiments, the second resin composition is the same as the first resin composition but does not contain a rheology modifier, and in certain other preferred embodiments the second resin composition is the same as the first resin composition including the rheology modifier.

In an embodiment, the moulding material according to the present invention further comprises a second non-woven fibre carrier between the structural reinforcement layer and the surface enhancing layer. The second non-woven fibre carrier may be the same as the first non-woven fibre carrier, but preferably the second non-woven fibre carrier has an areal weight greater than the first non-woven fibre carrier.

The second non-woven fibre carrier may comprise continuous fibres or discontinuous fibres. In an embodiment, the second non-woven fibre carrier comprises a veil (sometimes known as a fleece). The second non-woven fibre carrier typically consists of non-woven fibres of glass, carbon, polyester, polyamide, aramid (aromatic polyamide), or combinations thereof, which are bound together using an organic binder to impart structural integrity to the material. Preferably, the second non-woven fibre carrier comprises a glass fleece. The organic binder is typically present in an amount of 1 to 10% by weight based on the total weight of the second non-woven fibre carrier. Generally, the second non-woven fibre carrier will be of slightly higher areal weight or surface density than the first non-woven fibre carrier. In a preferred embodiment, the second non-woven fibre carrier is a non-woven veil having an areal weight of 20 to 100 $g/m^2$, preferably 20 to 90 $g/m^2$, more preferably 30 to 80 $g/m^2$, even more preferably 30 to 60 $g/m^2$. Suitable non-woven glass mats or fleeces are commercially available under the trade name Evalith® from Johns Manville, Denver, Colorado, USA, including but not limited to Evalith® ST-3022, S 4030 and S 5030, and under the trade name Changhai® from Taishan Fiberglass Inc., Economic Development Zone, Taian, Shandong, P.R. China, including but not limited to Changhai® S-SM30, S-SM50, S-HM30 and S-HM50.

The presence of the second non-woven fibre material helps to prevent "print-through" from the fibre reinforcement material in the structural reinforcement layer from appearing on the surface of the moulding material after curing, and also ensures that sufficient second resin composition is retained within the surface enhancing layer during cure, in order to avoid formation of narrow grooves or other surface irregularities due to resin starvation. The second non-woven fibre material, like the first non-woven fibre material, may also serve to prevent air bubble formation or to assist in dissipation of air bubbles with the first, second or third resin compositions.

The second non-woven fibre carrier may be present in combination with a third resin composition. The third resin composition may be positioned on either side of the second non-woven fibre carrier and may help to tack the second non-woven fibre carrier to the first non-woven fibre carrier and/or the structural reinforcement layer. After consolidation, the third resin composition may partially or fully impregnate the second non-woven fibre carrier.

When present, the second non-woven fibre carrier may optionally be provided attached to the fibrous reinforcement material of the structural reinforcement layer, for example these layers may be pre-attached by a resin material or by stitching.

Any of the resin compositions discussed with respect to the first or second resin composition are suitable for use as the third resin composition. However, it is not essential for the third resin composition to comprise a rheology modifier, although it may include one if desired. In certain preferred embodiments, the third resin composition is the same as the first and/or second resin composition but does not contain a rheology modifier, and in certain other preferred embodiments the second resin composition is the same as the first and/or second resin composition including the rheology modifier. Using the same resin composition as the first, second and third resin compositions, when present, is particularly advantageous, as it simplifies the process, and prevents any issues arising from possible incompatibilities between different resin compositions.

In an embodiment, the moulding material further comprises at least one additional structural reinforcement layer on a surface of the moulding material remote from the surface enhancing layer. The additional structural reinforcement layer or layers may be the same as the first structural reinforcement layer or may be different. In an embodiment, the additional structural reinforcement layer or layers are different from the first structural reinforcement layer, and the additional reinforcement layers may be associated with the same resin compositions as the first structural reinforcement layer or with different epoxy resin compositions. In this embodiment, the additional structural reinforcement layer or layers may be conventional prepregs, such as those commercially available under the trade name HexPly® from Hexcel Composites GmbH & Co KG, Neumarkt, Austria, including but not limited to the HexPly® M79 and M9 ranges of prepregs.

The total amount of resin provided in the moulding materials of the present invention will depend upon the intended use of the material. For example, where a moulding material is intended to be laid-up with other impregnated or partially impregnated materials and cured, the resin content may be relatively high. Alternatively, where the moulding materials of the present invention are intended for use in combination with unimpregnated (dry) fibre layers in intermediate structures that will subsequently be infused with resin before curing, the resin content may be relatively low. In all cases however, there should be sufficient resin to form a layer on the outer surface of the surface enhancing layer, i.e. the layer for contacting a surface of a mould or tool during laying up of the moulding materials. However, generally the total amount of resin present in the moulding materials of the present invention is from 10 to 60 wt % by weight of the moulding material. More preferably, in moulding materials intended for use with impregnated or partially impregnated materials, the total resin content is from 20 to 60 wt % by weight of the moulding material, even more preferably from 30 to 50 wt %; and in moulding materials intended for use in infusion systems, the total resin content is preferably from 10 to 50 wt % by weight of the moulding material.

The areal weight of the layer or layers of resin(s) within the moulding materials of the invention may therefore vary significantly depending upon the number of layers of resin(s), the presence of one or two structural reinforcement layers, and particularly on the weight of the fibrous reinforcement material forming the structural reinforcement layer and the presence of any additional structural reinforcement layers. As noted herein, the total resin may be made up of a number of different resin compositions, but in preferred embodiments the same resin composition is used throughout the moulding material.

Where different resin compositions are associated with different layers of the moulding material, the various resins are initially provided in contact with the layer with which they are associated when the moulding material is assembled before consolidation. Where the same resin composition is present throughout the moulding material, it may initially be provided as various layers throughout the moulding material, or it may initially be provided as a single layer; however, after consolidation, at least a portion of the resin composition should be present on the surface of the first non-woven fibre carrier remote from the structural reinforcement layer so as to provide an external mould or tool-contacting surface of the moulding material.

In an embodiment, the moulding material according to the present invention further comprises discontinuous indicator means attached to the mould or tool-contacting surface of the moulding material that do not fully penetrate the surface enhancing layer.

In the context of the present invention, the term "attached" means that the discontinuous indicator means are associated with the mould or tool-contacting surface of the moulding material and, thus, cannot be accidentally or easily removed during transportation to end users or in the course of subsequent processing steps.

In the context of the present invention, "discontinuous" means that the indicator means provide discrete areas of indicator within the surface enhancing layer and provide an indication as to which regions of the surface have been treated by, for example, sanding during post-curing treatment of the moulding material.

The discontinuous indicator means may be applied to the first resin composition on the external mould or tool—contacting surface of the moulding material during the assembly of the various layers and before consolidation, but preferably the discontinuous indicator means are applied after consolidation of the structural reinforcement layer and the surface enhancing layer (and any additional layers), but prior to curing. At this stage, i.e. before curing, the indicator means are loosely attached to the mould or tool-contacting surface of the moulding material due to the tack of the resin layer present on the mould or tool-contacting surface.

On curing the moulding material, the discontinuous indicator means become permanently fixed or embedded in the upper region of the surface enhancing layer, and will therefore be sufficiently attached to the mould or tool-contacting surface of the cured moulding materials that they are not removed by handling the material.

The indicator means may be bonded only at the surface of the mould or tool-contacting surface of the moulding material or they may penetrate into the surface. Where the discontinuous indicator means penetrate the surface finishing layer, they may do so to any depth, so long as they do not fully penetrate the layer, i.e. so that the indicator means do not contact the structural reinforcement layer (or the second non-woven fibre carrier, when present), so that if the surface enhancing layer is removed (e.g. by sanding) to such a depth that all of the discontinuous indicator means are removed, no damage will be caused to the underlying layers. Thus, the indicator means may penetrate the surface enhancing layer by any depth from 0% of the depth of the layer (i.e. bonded only to the surface) up to nearly, but not completely, 100% of the depth. In preferred embodiments, the indicator means penetrate the surface enhancing layer by from 0.1% to 95%, more preferably from 1% to 50% of the depth thereof.

The moulding materials of the present invention are particularly suitable for the inclusion of indicator means on the mould or tool-contacting surface of the moulding material because of the rheological properties of the surface enhancing layer provided by the rheology modifier of the first resin composition. In particular, the enhanced viscosity of the first resin composition means that the indicator means will attach to or embed in the surface layer and will remain as discrete shapes and will not significantly diffuse outwards or inwards, so that a clear pattern is maintained.

On de-moulding the cured article, the discontinuous indicator means remains present on the surface of the article, thereby enabling the article to be sanded easily without risk of the surface finishing layer being completely removed. In practice, an operator is able to determine whether or not all of the surface or the article has been sanded sufficiently by assessing whether or not all of the discontinuous indicator means have been removed.

The discontinuous indicator means may comprise any regular or irregular shapes, and the shapes may be arranged in any regular or irregular array, so long as they function as an indicator of sufficient surface treatment. Suitable shapes include lines (linear or curved), dots (including round, square or irregular dots) or mixtures thereof, in regular or irregular arrays. Preferably, the distances between individual shapes are generally less than the distance covered in a single sanding movement during manual sanding of a surface. Preferably, the indicator means comprise a regular array of regular dots, as this makes it easier to assess which areas have been surface treated, for example which areas have had the indicator means removed by sanding and which have been insufficiently treated.

The discontinuous indicator means may comprise any suitable materials that will remain visible on the surface of the moulding material following curing. In an embodiment, the indicator means comprise a refractive compound, such as, for example, a refractive metal oxide like titanium dioxide. The use of a refractive compound may be useful where the sanding of the article is automated and may facilitate the use of light scanning technology to assess progress rather than visual inspection. In other embodiments, indicator means may be formed from a dye or pigment, such as, for example, carbon black, or other similar substances. Suitable forms of carbon black for use in the invention include but are not limited to products sold under the trade name Printex®V manufactured by Orion Engineered Carbons LLC, 4501 Magnolia Cove Drive, Suite 106, Houston, Texas, 77345, United States of America. In such embodiments, it may be desirable to use a dye that is insoluble in the first resin composition, to prevent "bleeding" of the dye into other areas of the second resin composition. However, it will be readily apparent that the discontinuous means according to the present invention is not limited to the illustrative examples described above.

The indicator means could be applied to the mould or tool-engaging surface of the moulding material in any suitable way, for example by applying a perforated stencil thereto and spraying the surface with a solution or dispersion or solid particles of a suitable metal oxide, dye or pigment, followed by light pressure, such as by use of a hand roller. Alternatively, the indicator means could be applied by spraying or printing.

In a second aspect of the present invention, there is provided a process of preparing a moulding material, which comprises the steps of:
 (a) providing a structural reinforcement layer comprising a fibrous reinforcement material;
 (b) providing a surface enhancing layer, for contacting a surface of a mould or tool, comprising a first non-woven fibre carrier in combination with a first resin composition containing a rheology modifier and a curing agent, wherein the first resin composition is provided on an external mould or tool-contacting surface of the moulding material that is remote from the structural reinforcement layer; and
 (c) consolidating the layers so as to impregnate at least the first non-woven fibre carrier with the first resin compositions without curing the resin composition.

In the process of the present invention the consolidation is carried out following assembly of the structural reinforcement layer and the surface enhancing layers, and any other layers that may be included. Consolidation may be carried out in any conventional manner for forming a composite material, preferably by heating the moulding material under pressure. For example, consolidation may be carried out by passing the combined layers through consolidation rollers (such as one or more S-wrap rollers) and heating to, for example, 80° C.

In the process of the present invention the fibrous reinforcement material may optionally be present in combination with a second resin composition.

In an embodiment, the process according to the second aspect of the present invention further comprises the step of providing a second non-woven fibre carrier, optionally in combination with a third resin composition, between the structural reinforcement layer and the surface enhancing layer before the consolidation step.

In an embodiment, the process according to the second aspect of the present invention further comprises the step of providing at least one additional structural reinforcement layer on a surface of the moulding material remote from the surface enhancing layer before the consolidation step.

Where the structural reinforcement layer is provided in combination with a second resin composition and/or the second non-woven fibre carrier is provided in combination with a third resin composition, the materials may be provided with the structural materials already at least partially infused with the resin. Alternatively, in preferred embodiments, the structural and resin layers are provided as separate layers during assembly of the moulding material, and the resin layers are caused to at least partially impregnate the respective layers during the consolidation step.

In the process of the present invention, the first resin composition, first non-woven carrier, and, where present, the second resin composition, second non-woven fibre carrier, third resin composition and/or additional structural reinforcement layer(s) may each optionally be as defined for the like materials in the moulding material of the present invention.

In an embodiment, the process according to the second aspect of the present invention further comprises the step of applying discontinuous indicator means to the mould or tool-contacting surface of the moulding material and applying pressure, and optionally heat, so as to attach the discontinuous indicator means to the first resin composition without fully penetrating the surface enhancing layer. In the context of the present invention, the term "attach" means that the discontinuous indicator means are associated with the mould or tool-contacting surface of the moulding material and, thus, cannot be accidentally or easily removed during transportation to end users or in the course of subsequent processing steps. Following curing, the discontinuous indicator means remain visible on the mould or tool-contacting surface of the cured moulding, and may penetrate partially into the surface enhancing layer.

The discontinuous indicator means may be applied to the mould or tool-contacting surface of the moulding material at any stage during the lay-up of the material and before curing, for example before the consolidation step. Preferably, however, the discontinuous indicator means are added after the consolidation step but before curing. The discontinuous indicator means may be added to the surface in any suitable way. For example, the indicator means could be applied to the mould or tool-engaging surface of the moulding material by applying a perforated stencil thereto and spraying the surface with a solution or dispersion or solid particles of a suitable metal oxide, dye or pigment followed by light pressure, such as by use of a hand roller. Alternatively, the indicator means could be applied by spraying or printing.

In a third aspect of the present invention, there is provided a moulding material obtainable by a process according to the second aspect of the present invention.

In fourth aspect of the present invention, there is provided a process of preparing a moulded article which comprises curing a moulding material according to the first or third aspects of the present invention, optionally wherein the moulding material is laid-up with at least one additional structural reinforcement layer on a surface of the moulding material remote from the surface enhancing layer before the curing step.

The moulding materials of the present invention may cured to form moulded articles in any conventional manner taking into account the resin(s) and curing agent(s) present in the various layers. Thus, the appropriate conditions required to cure an article prepared from a moulding material according to the present invention can be determined empirically in accordance with standard procedures used in the prepreg industry.

In a fifth aspect of the present invention, there is provided a moulded article obtainable by a process according to the fourth aspect of the present invention.

In an embodiment, the moulded article has a moulded surface with a mean pinhole area of less than 1%, preferably less than 0.1%, and/or a mean pinhole size of less than 0.5 mm², preferably less than 0.05 mm², and/or an overlap defect of less than 10%, preferably less than 5%.

In a sixth aspect of the present invention, there is provided a process of preparing a finished moulded article, which comprises the steps of:
(a) preparing a moulding material by the process of the present invention including the step of applying discontinuous indicator means to the mould or tool-contacting surface of the moulding material and applying pressure, and optionally heat, so as to attach the discontinuous indicator means to the first resin composition without fully penetrating the surface enhancing layer;
(b) curing the moulding material in a mould or tool with the discontinuous indicator means in contact with the mould or tool, optionally wherein the moulding material is laid-up with at least one additional structural reinforcement layer on a surface of the moulding material remote from the surface enhancing layer before the curing step;
(c) removing the moulded article from the mould or tool, and finishing the moulded article of step (b) by abrasion of the mould or tool-contacting surface of the article to a depth sufficient to remove the discontinuous indicator means without fully removing the surface enhancing layer.

In this aspect of the present invention, the discontinuous indicator provides an operator with a sign that the outermost portion of the surface enhancement layer of the moulded article, which may be contaminated with mould release agent after demoulding, has been uniformly removed, without the risk of removing all of the surface enhancing layer.

In another aspect of the present invention, there is provided a finished article obtainable by a process according to the present invention in its sixth aspect.

FIG. 1 shows a partially sanded moulding material in accordance with a preferred embodiment of the present invention.

EXAMPLES

Example 1

A resin composition 1 was formulated from:
72.3 g Araldite® LY1589 (a semi-solid Bisphenol A diglycidyl ether epoxy resin manufactured by Huntsman Advanced Materials (Switzerland) GmbH, Basel, Switzerland);
18.17 g Araldite® LY1556 (a liquid bisphenol A diglycidyl ether epoxy resin manufactured by Huntsman Advanced Materials (Switzerland) GmbH, Basel, Switzerland);
0.10 g Araldite® DW 0135 (a blue pigment paste manufactured by Huntsman Advanced Materials (Switzerland) GmbH, Basel, Switzerland);
0.18 g BYK-A530 (an air release agent manufactured by BYK-Chemie GmbH, Wesel, Germany);
6.00 g Aerosil® R202 (a hydrophobic fumed silica rheology modifier manufactured by Evonik Resource Efficiency GmbH, Hanau-Wolfgang, Germany); and
2.82 g Dyhard® UR500 (a difunctional latent urone accelerator in powder form manufactured by Alzchem Group AG, Trostberg, Germany).

The components were mixed thoroughly at a temperature of 50 to 60° C. until the mixture was uniform in colour and consistency. The same resin composition 1 was used for each resin layer of the moulding material.

A moulding material 1 was constructed having the following architecture:
(1) a 400 g/m² layer of resin composition 1;
(2) a layer of LBB1200 fabric (1250 g/m² triaxial non-crimp glass fabric manufactured by Hexcel Reinforcements UK Limited, Narborough, Leicestershire, United Kingdom);
(3) a layer of Evalith® S 5030 (a glass fibre fleece having an areal weight of 50 g/m² manufactured by Johns Manville, Denver, Colorado, USA,);
(4) a 200 g/m² layer of resin composition 1;
(5) a layer of a lightweight, fully synthetic non-woven fibre veil comprising a blend of polyester and nylon fibres having an areal weight of 15 g/m² (manufactured by Technical Fibre Products Limited, Burnside Mills, Kendal, Cumbria, United Kingdom); and
(6) a 200 g/m² layer of resin composition 1.

The assembled layers were consolidated by passing through an S-wrap roller system heated to 80° C., to form moulding material 1.

Following consolidation, a layer of P34 Tygavac® RF260 (an FEP fluoropolymer release film having a staggered 12.7 mm centre perforation style and a nominal hole diameter of 1.143 mm manufactured by Tygavac Advanced Materials Limited, The Causeway, Broadway Business Park, Chadderton, Oldham OL9 9XD, United Kingdom), was positioned on top of the resin composition layer on the bottom surface of the prepreg (i.e., layer (6)—the surface adjacent to the mould surface that becomes the component surface on demoulding). Tioxide TR-81 (a titanium dioxide in powder form manufactured by Huntsman Advanced Materials (Switzerland) GmbH, Basel, Switzerland) was dusted over the surface of the film which was then lightly pressed with a rubber roller, before excess titanium dioxide and the release film were removed. The moulding material 1 was left with a regular array of dots of titanium dioxide having an areal weight of around 1.7 g/m² on the resin layer of the mould or tool-contacting surface.

A composite part was produced by placing the moulding material 1 into a composite tool treated with Zyvax® Watershield™ (a silicone-free water-soluble mould release agent manufactured by Freeman Manufacturing and Supply Company, Avon, Ohio, USA) and curing the assembly under vacuum for 6 hours at 80° C. and 1 bar pressure. On cooling, the cured moulded part was removed from the tool to reveal a discrete array of pigmented dots of titanium dioxide against the blue coloured background of the cured resin. The dots enabled uniform removal of part of the surface enhancing layer of the composite part by sanding (see FIG. 1).

FIG. 1 shows the cured moulding material 1 produced as set out above. The left hand half of the material 3 has been sanded to remove any mould release agent left on the surface following curing whilst the right hand side of the material 5 has not been sanded. The array of titanium dots 7 applied to the moulding material 1 before curing is still present on the right hand side of the material 5, whilst the absence of the regular array of dots 7 on the left hand side 3 indicates at least partial removal of the upper surface. The presence of scattered individual dots 9 on the left hand side 3 of the moulding material 1 indicates areas in which sanding has not been carried out sufficiently to completely remove the upper surface layer and in which further sanding should be completed.

A sample of uncured moulding material prepared in the manner described above was cut and overlapped in the X and Y directions across the surface of the mould, with approximately 2-3 cm regions of overlap. Further moulding material was placed over the top without any area of overlap and the resultant assembly cured in the manner described above. On cooling and demoulding, the overlap regions of the cured article showed very little defects compared to a standard part produced from non-overlapped moulding material.

Example 2

A resin composition 2 was formulated from:
72.9 g Kukdo KFR136SL, a semi-solid bisphenol A diglycidyl ether epoxy resin manufactured by Kukdo Chemical Company Limited, Seoul, Korea);
18.2 g Epikote®828 (a liquid bisphenol A diglycidyl ether epoxy resin manufactured by Hexion Inc., Columbus, Ohio, USA);
6 g Aerosil® R202 (a hydrophobic fumed silica rheology modifier manufactured by Evonik Resource Efficiency GmbH, Hanau-Wolfgang, Germany); and
2.9 g Dyhard® UR500 (a difunctional latent urone accelerator in powder form manufactured by Alzchem Group AG, Trostberg, Germany).

The components were mixed thoroughly at a temperature of 50 to 60° C. until the mixture was uniform in colour and consistency. The same resin composition 2 was used for each resin layer of the moulding material.

A moulding material 2 was constructed having the following architecture:
(1) a 400 g/m$^2$ layer of resin composition 2;
(2) a layer of LBB1200 fabric (1250 g/m$^2$ triaxial non-crimp glass fabric manufactured by Hexcel Reinforcements UK Limited, Narborough, Leicestershire, United Kingdom);
(3) a layer of Evalith® S 5030 (a glass fibre fleece having an areal weight of 50 g/m$^2$ manufactured by Johns Manville, Denver, Colorado, USA,);
(4) a layer of a lightweight, fully synthetic non-woven fibre veil comprising a blend of polyester and nylon fibres having an areal weight of 15 g/m$^2$ manufactured by Technical Fibre Products Limited, Burnside Mills, Kendal, Cumbria, United Kingdom); and
(5) a 400 g/m$^2$ layer of resin composition 2.

The assembled layers were consolidated by passing through an S-wrap roller system heated to 80° C., to form moulding material 2.

The moulding material 2 was placed into a composite tool treated with Zyvax® Watershield™ (a silicone-free water soluble mould release agent manufactured by Freeman Manufacturing and Supply Company, Avon, Ohio, USA) with the resin composition layer (5) adjacent to the face of the mould. Two layers of HexPly® 79 (a prepreg manufactured by Hexcel GmbH, Neumarkt, Germany) were placed on top of the moulding material in the mould, i.e. next to the resin layer (1); and the assembly was cured under vacuum for 6 hours at 80° C. and 1 bar pressure. On cooling, the cured moulded part was removed for inspection and further testing.

In an alternative embodiment, a layer of discrete indicator means comprising a regular array of titanium dioxide dots could be applied to the moulding material 2 after consolidation and before curing.

Test Equipment and Methods
Matrix Rheology

Rheology measurements on resin compositions were conducted with a TA HR-2 Discovery Hybrid Rheometer manufactured by TA Instruments, New Castle, Delaware, USA, using 25 mm parallel plates with a gap of 1 mm set of provide a shear rate of 0.1 to $100^{-s}$, and a temperature of 60° C.

Veil Characterisation

Fibre diameter and veil openness measurements may be made using a Keyence VHX-6000 series Digital Microscope manufactured by Keyence (UK) Limited, Milton Keynes, Buckinghamshire, United Kingdom. The veil used as the first non-woven fibre carrier (i.e., the surface veil used in the surface enhancing layer) may be presented to the microscope by mounting it to a blue plastic card in order to help highlight the open areas when viewed on the computer monitor. The microscope was is set at 175× magnification with the light output set to maximum and the gain dial settings adjusted so that the open areas can be clearly identified. The computer image saved represents a total area of 2951002 μm$^2$.

The air permeability of the non-woven fibre carrier may be measured by ASTM D737-18—Standard Test Method for Air Permeability of Textile Fabrics.

The Keyence software is then used to measure the thickness (diameter) of individual fibres, the average "open area" (i.e. empty space between fibres) and the % of openness. The image is also manipulated by means of adjusting sliders on a histogram in order to create a two colour image whereby one colour represents the veil fibres and the other represents the open space. The software is then used to measure the areas of all the individual open spaces. This data may be saved to a spreadsheet and used to calculate the total area occupied by open spaces (in order to calculate the % openness) along with the average size of the open areas.

Cured Surface Characterisation

Cured surface characterisation was determined by wiping the surface of a demoulded composite part with a slurry of carbon black in acetone. Excess slurry was washed away before measuring using a Keyence VHX-6000 series Digital Microscope using 25× magnification and a gain setting adjusted so that the surface defects could be clearly identified. The observed image of 132.63 mm$^2$ was manipulated using the Keyence software such that the histogram slider was set between 000 and 065, the brightness tolerance set to 20 and noise filter set to 10. The software was used to measure the mean area of the observed pinholes and the percentage total observed area identified as pinholes.

Overlap defects were measured by first highlighting the defects along an overlap using a slurry of carbon black in acetone. After washing away any excess slurry, the length of any defects was measured using a ruler. The amount of overlap defects was expressed as a percentage of the sum of the measured defects with respect to the length of the overlap.

Results

The viscosities of M79® resin (a commercially available non-rheology modified epoxy resin matrix manufactured by Hexcel Composites GmbH and Co., KG, Neumarkt, Austria) and rheology modified resin composition 1 used in moulding material 1 in Example 1 above (which is in accordance with the present invention) were tested as set out above.

For M79, the viscosity at 60° C. and at 0.1 s$^{-1}$ was 40 Pa·s; and the viscosity at 60° C. and at 100 s$^{-1}$ was 29 Pa·s.

For resin composition 1, the viscosity at 60° and at 0.1 s$^{-1}$ was 470 Pa·s; and the viscosity at 60° C. and at 100 s$^{-1}$ was 66 Pa·s.

A material according to the present invention was prepared, cut and overlapped in the X and Y directions across the surface of a mould, with approximately 2-3 cm regions of overlap and the material was cured as discussed in Example 1. Three comparative laminates not falling within the scope of the invention were also prepared and treated as above.

Comparative laminate 1 comprised a standard prepreg e.g. M79/40%/LBB1200 with the biaxial portion adjacent to the mould surface, with no surface enhancing non-woven fibre carrier, no intermediate non-woven fibre carrier, and with non-rheology modified resin (M79).

Comparative laminate 2 comprised a standard prepreg e.g. M79/40%/LBB1200 with the biaxial portion nearest to the mould surface, with no surface enhancing non-woven fibre carrier, but with an S5030 non-woven fibre carrier between the reinforcement layer and the mould, and with non-rheology modified resin (M79).

Comparative laminate 3 comprised a standard prepreg e.g. M79/40%/LBB1200 with the biaxial portion nearest to the mould surface, but with a surface enhancing non-woven fibre carrier in the outer layer adjacent to the mould and an S5030 non-woven fibre carrier between the reinforcement layer and the surface enhancing non-woven fibre carrier. However, the resin of the comparative laminate was a non-rheology modified resin (M79).

Surface characterization for pinholes and overlap defects in composite parts prepared by curing control laminates 1, 2 and 3 and the surface finishing moulding material in accordance with the present invention typically gave the following results:

|  | Control laminate 1 | Control laminate 2 | Control laminate 3 | Inventive example |
|---|---|---|---|---|
| Matrix rheology | Not modified | Not modified | Not modified | Rheology modified- |
| Non-woven carrier adjacent mould | None | None | Thermoplastic Veil | Thermoplastic Veil |
| Intermediate non-woven carrier | None | S5030 | S5030 | S5030 |
| Cured laminate pinholes area (%) | 27.00 | 11.60 | 0.04 | 0.09 |
| Cured laminate mean pinhole size (mm$^2$) | 0.092 | 0.040 | 0.003 | 0.004 |
| Overlap defect % | 95-100 | 95-100 | 95-100 | <5% |

The moulding materials according to the present invention can be cured at low temperatures (typically 100° C.) to provide moulded articles with good surface finish showing reduced pinhole and overlap defects and requiring minimal surface processing. Such materials can be provided with sacrificial discontinuous indicator means on the moulded surface to facilitate uniform surface processing.

The invention claimed is:
1. A moulding material comprising:
(a) a structural reinforcement layer comprising a fibrous reinforcement material, said structural reinforcement layer having an upper and a lower surface, said structural reinforcement layer comprising a non-crimp glass fabric;
(b) a surface enhancing comprising a first non-woven fiber carrier, said first non-woven fiber carrier having an areal weight of 1 to 80 g/m$^2$, said surface enhancing layer having an upper and a lower surface, said first non-woven fiber carrier having an openness of 1 to 10% and/or a mean open area of between about 75 to 350μ/m$^2$, said first non-woven fiber carrier being conjoined to the lower surface of said structural reinforcement layer;
(c) a layer of resin, said layer of resin comprising an epoxy and a rheology modifier and a curing agent, said layer of resin having an upper and lower surface, said resin composition having a viscosity at 60° C. and at 0.1 s$^{-1}$ of from 200 to 1000 Pa·s; and a viscosity at 60° C. and at 100 s$^{-1}$ of 25% or less of the viscosity at 0.1 s$^{-1}$, but not less than 25 Pa·s (as measured by a shear sweep viscosity method), said layer of resin being disposed between said structural reinforcement layer and said first non-woven fiber carrier;
(d) a second non-woven fiber carrier comprising polyester or nylon fibers, or blends thereof, said second non-woven fiber carrier having an upper and a lower surface, said upper surface being conjoined to the lower surface of said first non-woven fiber carrier, and having an areal weight lower than that of the first non-woven fiber carrier; and
wherein said resin layer is conjoined to the lower surface of said structural reinforcement layer, whereby said resin layer impregnates said structural reinforcement layer and said first non-woven layer fully, and said resin layer impregnates said second non-woven fiber carrier at least partially;
whereby, upon cure of said moulding material, a cured article is formed, having with a mean pinhole area of less than 0.1%, and/or a mean pinhole size of less than 0.05 mm$^2$, and/or an overlap defect of less than 5%.
2. The moulding material of claim 1, further comprising:
(e) discontinuous indicator means disposed in the lower surface of said second non-woven fiber carrier layer, comprising a refractive metal oxide, or a dye or pigment, said indicator means comprising an array of shapes; wherein said discontinuous indicator means do not fully penetrate the upper surface of said second non-woven fiber carrier layer.
3. The moulding material of claim 2, wherein said discontinuous indicator means are in the shape of lines, dots, or combinations thereof.
4. The moulding material of claim 3, wherein said discontinuous indicator means comprises carbon black.
5. A process of preparing a moulding material suitable to be moulded into articles having a superior surface finish, said process comprising the steps of:
(a) providing a structural reinforcement layer comprising a fibrous reinforcement material, said structural reinforcement layer having an upper and a lower surface, said structural reinforcement layer comprising a non-crimp glass fabric;
(b) providing a surface enhancing layer comprising a first non-woven fiber carrier, said first non-woven fiber carrier having an areal weight of 1 to 80 g/m$^2$, said surface enhancing layer having an upper and a lower surface, said first non-woven fiber carrier having an openness of 1 to 10% and/or a mean open area of between about 75 to 350μ/m$^2$, said first non-woven fiber carrier being conjoined to the lower surface of said structural reinforcement layer;
(c) providing a layer of resin, said layer of resin comprising an epoxy and a rheology modifier and a curing agent, said layer of resin having an upper and lower surface, said resin composition having a viscosity at 60° C. and at 0.1 s$^{-1}$ of from 200 to 1000 Pa·s; and a viscosity at 60° C. and at 100 s$^{-1}$ of 25% or less of the viscosity at 0.1 s$^{-1}$, but not less than 25 Pa·s (as measured by a shear sweep viscosity method), said layer of resin being disposed between said structural reinforcement layer and said first non-woven fiber carrier;

(d) providing a second non-woven fiber carrier comprising polyester or nylon fibers, or blends thereof, said second non-woven fiber carrier having an upper and a lower surface, said upper surface being conjoined to the lower surface of the said first non-woven fiber carrier, and having an areal weight lower than that of the first non-woven fiber carrier; and (e) conjoining said resin layer to the lower surface of said structural reinforcement layer, whereby said resin layer impregnates said structural reinforcement layer and said first non-woven layer fully and said resin layer impregnates said second non-woven fiber carrier at least partially.

6. The process of claim 5, further comprising:

(f) providing a discontinuous indicator means disposed in the lower surface of said second non-woven fiber carrier layer, comprising a refractive metal oxide, or a dye or pigment, said indicator means comprising an array of shapes; wherein said discontinuous indicator means does not fully penetrate the upper surface of said second non-woven fiber carrier layer.

7. A process of producing cured molded articles, said process comprising:

(a) preparing a moulding material by the process as claimed in claim 6, and subsequently;

(b) curing the moulding material in a mould or tool with the discontinuous indicator means in contact with the mould or tool, wherein the moulding material is laid-up with at least one additional structural reinforcement layer on a surface of the moulding material remote from the surface enhancing layer before the curing step;

(c) removing the moulded article from the mould or tool, and (d) finishing the moulded article of step (b) by abrasion of the mould or tool-contacting surface of the article to a depth sufficient to remove the discontinuous indicator means without fully removing the surface enhancing layer.

* * * * *